United States Patent [19]
Avnon et al.

[11] Patent Number: 5,103,420
[45] Date of Patent: Apr. 7, 1992

[54] METHOD AND APPARATUS FOR SRT DIVISION USING GRAY CODED QUOTIENT BIT SIGNALS

[76] Inventors: Dror Avnon; Zvi Greenfeld, both of P.O. Box 3007, Herzlia B. 46104, Israel; Gideon Yuval, 613 151st Pl., NE., Bellevue, Wash. 98007; Yair Baydach, P.O. Box 3007, Herzlia B. 46104, Israel

[21] Appl. No.: 449,366

[22] Filed: Dec. 4, 1989

[51] Int. Cl.$^5$ .............................................. G06F 7/52
[52] U.S. Cl. .................................................. 364/764
[58] Field of Search ............ 364/764, 766, 767, 746.2, 364/745, 200 MS File, 900 MS File

[56] References Cited

U.S. PATENT DOCUMENTS

| | | | |
|---|---|---|---|
| 4,692,891 | 9/1987 | Yamaoka et al. | 364/766 |
| 4,722,069 | 1/1988 | Ikeda | 364/767 |
| 4,939,686 | 7/1990 | Fandrianto | 364/752 |

OTHER PUBLICATIONS

T. E. Williams, et al., "SRT Division Diagrams and their Usage in Designing Custom Integrated Circuits for Division," Technical Report No. 87-236 (Nov. 1986), pp. 1-19.

J. Fandrianto, "Algorithm for High Speed Shared Radix 4 Division and Radix 4 Square-Root," Proceedings of IEEE Symposium on Computer Arithmetic (1987), pp. 73-79.

G. S. Taylor, "Compatible Hardware for Division and Square Root," Proceedings of the Fifth IEEE Symposium of Computer Arithmetic (1981), pp. 127-134.

M. D. Ercegovac, "A Division Algorithm with Prediction of Quotient Digits," Proceedings of the Seventh IEEE Symposium on Computer Arithmetic (1985), pp. 51-56.

G. S. Taylor, "Radix 16 SRT Dividers with Overlapped Quotient Selection Stages," Proceedings of the Seventh IEEE Symposium on Computer Arithmetic (1985), pp. 64-71.

*Primary Examiner*—Gary V. Harkcom
*Assistant Examiner*—Long T. Nguyen
*Attorney, Agent, or Firm*—Limbach & Limbach

[57] ABSTRACT

A method and apparatus for performing SRT division, in which Gray coded quotient bit signals are generated during each iteration from a divisor signal having Gray coded bits, and a dividend signal. Preferably, only the two most significant bits of the divisor signal are encoded into Gray code at the start of the division process, and the Gray coded quotient bit signals are decoded after each iteration, or after the final iteration, for use in generating the final quotient. In a preferred embodiment, the invention is a circuit capable of performing both single-precision and double-precision operations, and includes a pair of alternately operating divider block circuits each for generating a pair of quotient bits during each iteration cycle. The quotient bits emerging from each divider block circuit are decoded, and then shifted into one of two divider result registers depending upon their sign until 56 quotient bits (for double-precision operation) or 28 quotient bits (for single-precision operation) are accumulated in the divider result registers. When sufficient quotient bits have been accumulated, the invention asserts the contents of the divider result registers, a remainder sum register, and a remainder carry register, as output signals which may be combined to generate a final quotient signal.

16 Claims, 2 Drawing Sheets

METHOD AND APPARATUS FOR SRT DIVISION USING GRAY CODED QUOTIENT BIT SIGNALS

FIELD OF THE INVENTION

The invention is a method and apparatus for performing the iterative process known as higher radix nonrestoring division ("SRT division"). More particularly, the invention is an SRT division method and apparatus in which at least two Gray coded quotient bit signals are generated during each iteration, and then decoded for use in generating the final quotient.

BACKGROUND OF THE INVENTION

Numerous implementations of the conventional division algorithm known as higher radix nonrestoring division ("SRT division") have been proposed. SRT division is an iterative algorithm in which one or more quotient bits are generated during each iteration, and in which positive and negative quotient bit component signals are resolved into a final quotient vector signal at the end of the last iteration.

In SRT division, the quotient bit representations are redundant in the sense that any one quotient bit may be represented in several different ways by different combinations of positive and negative quotient bit component signals. At the end of the last iteration during SRT division, it is conventional to convert the quotient bit representation (containing positive and negative component signals) to an irredundant representation (containing no negative component signals) by subtracting the negative quotient bit components from the positive quotient bit components.

In radix $2^n$ SRT division, n quotient bits are generated per iteration. Radix $2^n$ SRT division is the most convenient form of SRT division for binary hardware implementation, since it allows the final quotient to be conveniently formed by concatenating the individual quotient bits. For example, a preferred embodiment of the inventive divider circuit performs radix 4 SRT division.

Because of the redundancy in the quotient digit representations in SRT division, it is not necessary to calculate quotient bits exactly. Instead, SRT division circuits generate predictions of each quotient bit based upon approximations of the operands. Such approximations are obtained by examining only the few most significant bits of the divisor and partial remainder during each iteration. Any errors in prediction of quotient bits are corrected during later iterations by less significant quotient bits of the opposite sign.

Conventional SRT division circuits have employed quotient bit prediction units with large look-up tables (implemented as complicated programmable logic arrays). It would be highly desirable to minimize table storage requirements in SRT division circuits, and thus to reduce the number of transistors and other circuit elements required for implementing the quotient bit prediction look-up tables. However, until the present invention, it was not known how to accomplish this objective.

SUMMARY OF THE INVENTION

The invention is a method and apparatus for performing SRT division, in which two or more Gray coded quotient bit signals are generated during each iteration from Gray coded divisor and dividend signals. The divisor and dividend are encoded into Gray code at the start of the division process, and the Gray coded quotient bit signals are decoded after each iteration, or after the final iteration, for use in generating the final quotient.

In a preferred embodiment, the inventive circuit is capable of performing both single-precision and double-precision division, and includes a pair of alternately operating divider block circuits each for generating a pair of quotient bits during each iteration cycle. The quotient bits emerging from each divider block circuit are decoded, and then shifted into one of two divider result registers (depending upon their sign) until 56 quotient bits (during double-precision operation) or 28 quotient bits (during single-precision operation) are accumulated in the divider result registers. At the end of this accumulation process, the inventive circuit asserts the contents of the divider result registers (as well as the contents of a remainder sum register and a remainder carry register) as output signals which may be combined to generate a final quotient signal.

Use of Gray coded signals in accordance with the invention reduces substantially the number of transistors required for implementing the quotient predictor circuitry employed. The additional hardware required for encoding and decoding is very small in comparison with the quotient predictor hardware savings. The invention permits simplified, more efficient implementation of quotient bit prediction, which not only saves hardware, but makes it easier to fulfill timing requirements in circuit design (since the quotient prediction logic is in the timing critical path). This latter benefit may be as important (or even more important) to circuit designers than the former benefit.

DETAILED DESCRIPTION OF THE PREFERRED EMBODIMENTS

In the Specification, the phrase "Gray coded" signal is used to denote a signal that has been encoded into a Gray code format. Gray codes comprise a class of codes in which any two adjacent code words differ by a single bit location. A Gray code useful in practicing the invention is shown in Table 1:

TABLE 1

| Decimal Integer | Gray Code Version |
|---|---|
| 0 | 0...000 |
| 1 | 0...001 |
| 2 | 0...011 |
| 3 | 0...010 |
| 4 | 0...110 |
| 5 | 0...111 |
| . | . |
| . | . |
| . | . |

In performing the invention, a Gray coded divisor signal is iteratively processed with a Gray coded dividend signal (during the first iteration) and with partial remainder signals (during subsequent iterations) in a logic array (sometimes referred to herein as a "look-up table") to generate Gray coded quotient bit signals.

Figure 1:
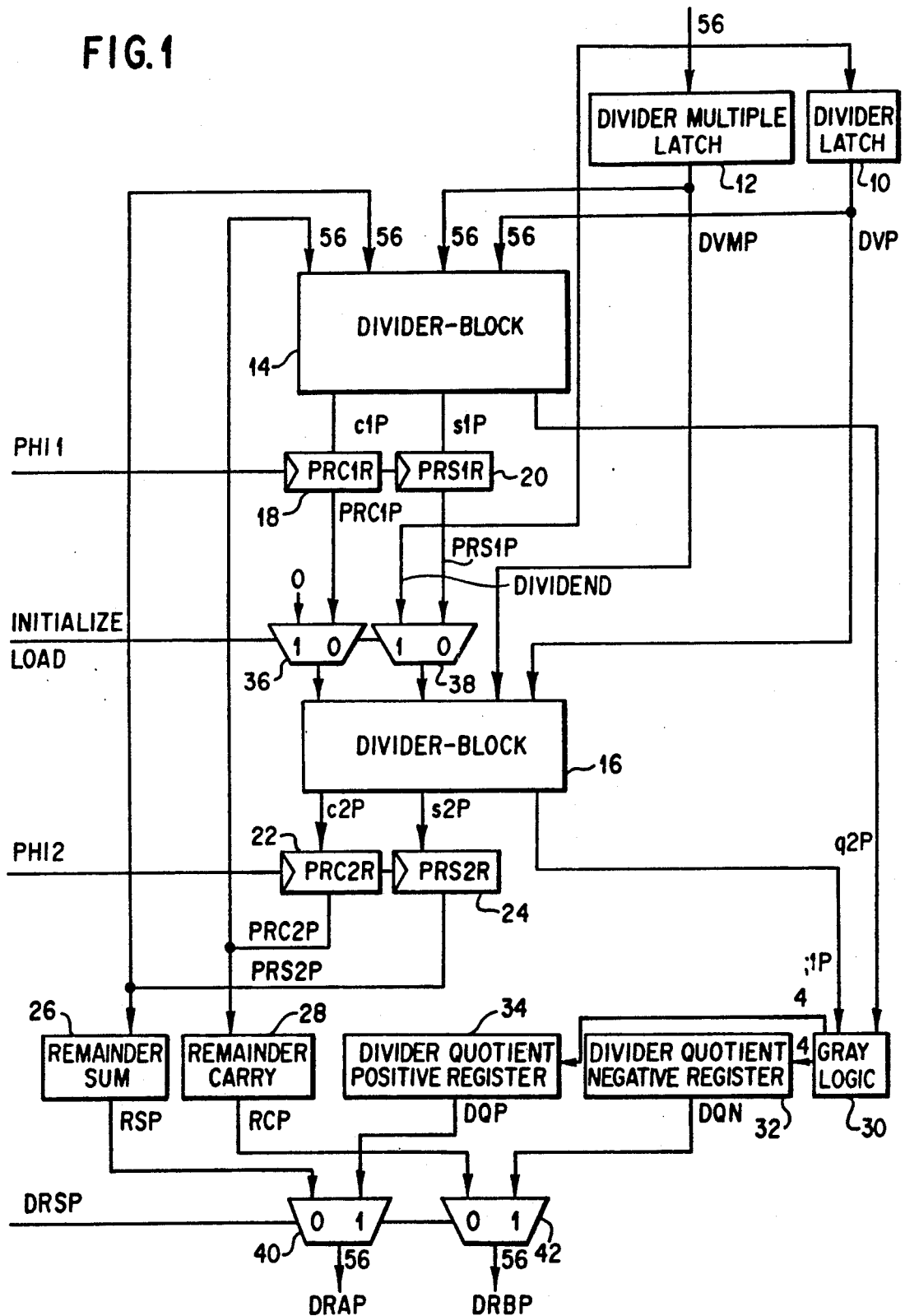
FIG. 1 is a block diagram of a preferred embodiment of an SRT division circuit embodying the invention.
Figure 2:
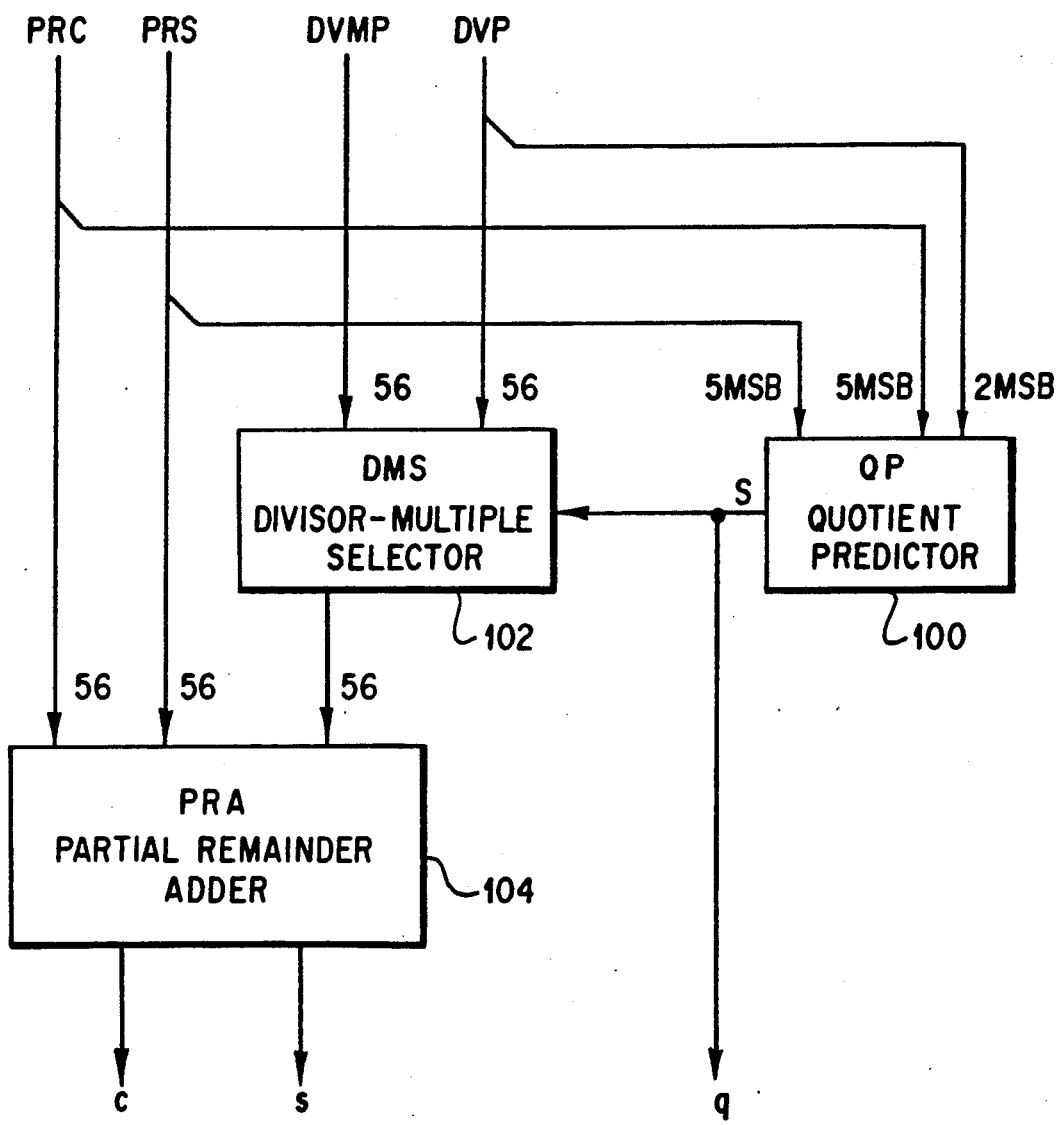
FIG. 2 is a block diagram of a preferred embodiment of one of the two divider block units in the FIG. 1 circuit.

A preferred embodiment of the invention for performing radix 4 SRT division will be described with reference to FIGS. 1 and 2. FIG. 1 is the overall circuitry for generating a quotient signal from a divisor signal and a dividend signal, and includes a pair of identical divider block circuits 14 and 16. A preferred embodiment of divider block circuit 14 (or 16) is shown in FIG. 2.

Initialization of the FIG. 1 circuit requires three clock cycles. During the first cycle, a 56-bit divisor signal is latched into divisor latch 10. During the second cycle, a multiple of the divisor signal (a "divisor multiple" signal) is stored in divisor multiple latch 12. The divisor multiple signal is preferably generated by adding to the divisor signal a realigned version of itself that has been shifted one position to the right. For example, if the divisor signal is "0 ... 01010", the realigned version of itself will be "0 ... 00101" and the divisor multiple signal will be "0 ... 01111."

Latches 10 and 12 hold the divisor and divisor multiple signals without encoding or decoding them. Upon entering divider block 14 (or divider block 16) the two most significant bits of the divisor signal are Gray coded. This encoding operation is performed in the quotient predictor logic array 100 (shown in FIG. 2, to be described below) within divider block 14 and divider block 16. The technique of encoding only the two most significant bits of the divisor signal is very important in implementing the invention since the amount of logic required to implement such Gray coding is minimal, and since the Gray coding of only the two most significant bits does not add any delay to the critical path (because the divisor is stable throughout the divide iterations). At the same time, the Gray coding technique permits a simplified implementation of quotient predictor array 100, requiring much less hardware than would otherwise be required if no Gray coding were performed.

During the third cycle, the "Initialize Load" signal is asserted to multiplexer circuits 36 and 38, to cause the 56-bit dividend signal to be supplied through multiplexer 38 to divider block 16, and a zero "remainder carry" signal to be supplied through multiplexer 36 to divider block 16, to commence the first iteration of the SRT division process. After the division process commences, the "Initialize Load" signal is not asserted, so that multiplexers 36 and 38 will supply partial remainder carry signal PRC1P and partial remainder sum signal PRS1P, respectively, to divider block 16 during the division process iterations.

Each iteration of the division process includes two phases. During the first phase in each iteration cycle, the divisor and divisor multiple signals and the output of multiplexers 36 and 38 are processed in divider block 16. During the second phase in each iteration cycle, the divisor and divisor multiple signals and the partial remainder signals supplied from registers 22 and 24 (to be discussed below) are processed in divider block 14.

Divider block 16 generates from its input signals (the divisor and divisor multiple signals and the output of circuits 36 and 38) the following output signals: a pair of quotient bits and an associated sign bit indicating whether the quotient bits have positive or negative magnitude (these three bits are collectively labeled "q1P" in FIG. 1); a L partial remainder sum signal ("c2P"); and a partial remainder carry signal ("s2P"). During the first iteration cycle, the outputs of multiplexers 36 and 38 are respectively "zero" and the dividend. In subsequent iteration cycles, the output of circuits 36 and 38 are respectively partial remainder signals PRC1P and PRS1P (to be discussed below). Partial remainder sum signal c2P and partial remainder carry signal s2P are sent to shift registers 22 and 24, respectively, and are clocked out of shift registers 22 and 24, by clock signal PHI 2, as partial remainder signals PRC2P and PRS2P, respectively.

Signals PRC2P and PRS2P are supplied to divider block 14, in which they are processed (with the divisor and divisor multiple signals) to generate the next pair of quotient bits and the next associated sign bit indicating whether these quotient bits have positive or negative magnitude (these three bits are collectively labeled "q2P" in FIG. 1), the next partial remainder sum signal ("c1P"), and the next partial remainder carry signal ("s1P").

Partial remainder sum signal c1P and partial remainder carry signal s1P are sent to shift registers 18 and 20, respectively, and are then clocked out of registers 18 and 20, by clock signal PHI 1, as partial remainder signals PRC1P and PRS1P, respectively. Clock signal PHI 1 is preferably 180 degrees out of phase with respect to clock signal PHI 2. Partial remainder signals PRC1P and PRS1P are supplied as inputs to multiplexers 36 and 38, respectively.

Divider block 14 employs the two most significant bits from the divisor, and the five most significant bits from the partial remainder signals PRC2P and PRS2P to select the quotient bits q2P. Divider block 16 employs the two most significant bits from the divisor, and the five most significant bits from the partial remainder signals PRC1P and PRS1P (or the dividend signal) to select the quotient bits q1P. Divider circuits 14 and 16 are designed to accept partially Gray coded divisor, divisor multiple, and dividend signals, and to produce Gray coded quotient signals q1P and q2P (each of which signals includes three bits).

The preferred structure of divider circuit 14 (and identical divider circuit 16) will be described with reference to FIG. 2. In FIG. 2, partial remainder sum signal PRS and partial remainder carry signal PRC (the output of multiplexers 36 and 38, or 22 and 24), and divisor signal DVP are supplied to quotient predictor logic array 100. As explained above, quotient predictor logic array 100 includes logic circuitry for Gray coding the two most significant bits of divisor signal DVP.

In a preferred embodiment, quotient predictor logic array 100 also includes a programmable logic array for asserting (in response to the input signals PRS, PRC, and DVP) three Gray coded quotient bits q (quotient bits q correspond to q2P or q1P in FIG. 1). Quotient bits q are decoded in Gray logic unit 30 shown in FIG. 1, and the decoded bits asserted by decoding logic unit 30 are supplied to the appropriate one of shift registers 32 and 34. Only a minimal amount of hardware is required within unit 30 to decode the three quotient bits, and the decoding operation does not introduce timing problems into the overall system.

As also shown in FIG. 2, divisor signal DVP, divisor multiple signal DVMP, and quotient bit signal "q" are supplied to divisor multiple selector 102. Circuit 102 selects a pre-calculated multiple of the divisor to be sent to partial remainder adder circuit 104. Adder circuit 104 receives the partial remainder sum signal PRS and the partial remainder carry signal PRC, and adds them to the divisor multiple from selector 102 to generate the next partial remainder signal "s" and the next partial remainder carry signal "c". On the last iteration of the division operation, the last partial remainder signal "s"

(and remainder carry signal "c") to have been generated are latched respectively into remainder sum register 26 and remainder carry register 28 (shown in FIG. 1).

At the end of each iteration cycle (i.e., after each group of two consecutive phases), the quotient bit signals "q1P" and "q2P" are decoded in Gray logic unit 30, and the decoded signals are shifted into either negative divider quotient register 32 or positive divider quotient register 34, depending on the sign of each. Logic unit 30 is designed to assert a four-bit quotient magnitude signal to register 32 and a four-bit quotient magnitude signal to register 34, in response to each three-bit signal "q1p" and "q2P."

In a double-precision mode, the quotient bit generation iteration cycles will continue until 56 quotient signal magnitude bits have been calculated and accumulated in each of registers 32 and 34. In a single-precision mode, the quotient bit generation iterations will continue until 28 quotient signal magnitude bits have been calculated and accumulated in each of registers 32 and 34. Since two quotient magnitude bits are generated during each phase, four Gray coded quotient magnitude bit signals (as well as related sign and remainder signals) are generated during each iteration cycle. Thus, double-precision mode division requires 14 iteration cycles (not including overhead), and single-precision mode division requires 7 iteration cycles (not including overhead). The inventive circuit can be controlled to operate in either mode by reading out of the contents of registers 26, 28, 32, and 34 (to be discussed below) after a selected number of cycles. For double-precision operation of the FIG. 1 embodiment, registers 26, 28, 30, and 34 are read out after 14 cycles (plus any overhead cycles), and for single-precision operation, registers 26, 28, 30, and 34 are read out after 7 cycles (plus any overhead cycles).

Two extra Gray coded quotient magnitude bit signals are generated, and accumulated in each of registers 32 and 34, in each mode. These two additional bits (the least significant bits of the output of registers 32 and 34) are the "Guard" and "Round" bits needed for rounding in accordance with IEEE standards. We also contemplate that the so-called "Sticky" bit (needed for rounding in accordance with IEEE standards) will be calculated in a conventional manner from the remainder signals RSP and RCP (output from registers 26 and 28) by means not shown in FIGS. 1 and 2.

The decoded quotient bits from unit 30 are effectively concatenated in registers 32 and 34, so that the contents of each of registers 32 and 34 represents a multi-bit quotient magnitude component vector. Following the last iteration cycle, the contents of negative divider quotient register 32 (signal DQN) and positive divider quotient register 34 (signal DQP) are multiplexed with the contents of remainder sum register 26 and remainder carry register 28, in multiplexers 40 and 42. In response to control signal "DRSP," circuits 40 and 42 will assert, respectively, either the remainder signals from registers 26 and 28, or the quotient magnitude signals from registers 34 and 32. The multi-bit signal asserted by circuit 40 is denoted as "DRAP" (divider result part A), and the multi-bit signal asserted by circuit 42 is denoted as "DRBP" (divider result part B).

The remainder sum and carry signals asserted by circuits 40 and 42 (signals RSP and RCP, when control signal DRSP is "zero") may be processed (by means not shown) to extract from them the sign of the remainder. If the remainder is negative, then the quotient must be decremented by one. If the remainder is positive, the quotient is not decremented.

The quotient magnitude component signals asserted by circuits 40 and 42 (signals DQP and DQN, when control signal DRSP is "one") may be processed (by means not shown) to yield a final quotient by subtracting negative magnitude component signal DQN from positive magnitude component signal DQP. Rounding and normalization may then be performed in a conventional manner. The two least significant bits of the final quotient are taken as the Guard and Round bits. The Sticky bit is generated in accordance with the following rule: it is set to zero if the sum of the remainder signals RSP and RCP is zero, and it is set to one if the sum of the remainder signals RSP and RCP is not zero.

We have recognized that use of Gray coded signals reduces substantially the number of transistors required for implementing quotient predictor 100. Thus, the invention permits more efficient implementation of quotient bit prediction, as may be appreciated by comparing Tables 2 and 3 set forth below. Table 2 is a truth table readily implementable by a conventional quotient predictor for processing normally coded signals (not Gray coded signals), of the type that could be substituted for circuit 100 in a modified version of the FIG. 2 circuit. Table 3 is a truth table readily implementable by the inventive predictor 100 (designed for processing Gray coded signals).

TABLE 2

| INPUT SIGNALS | | OUTPUT SIGNAL |
|---|---|---|
| Divisor Bits | Partial Remainder | Signed Quotient |
| XX | 0X1XX | 010 |
| XX | 1XX0X | 100 |
| X1 | X010X | 011 |
| X0 | 0X11X | 001 |
| 00 | 0X0X0 | 001 |
| 00 | XXX01 | 001 |
| X1 | X00XX | 001 |
| 10 | 10XXX | 010 |
| 00 | XX011 | 010 |
| 00 | 1X10X | 011 |
| 01 | 10XXX | 010 |
| 00 | 1X01X | 010 |
| X1 | 1X0X0 | 001 |
| 01 | 1X000 | 010 |
| XX | 01XXX | 010 |
| XX | 1X00X | 001 |
| XX | 10XXX | 101 |
| XX | 1X0XX | 100 |
| 1X | X0XXX | 001 |
| XX | 100XX | 010 |

TABLE 3

| INPUT SIGNALS | | OUTPUT SIGNAL |
|---|---|---|
| Divisor Bits (Gray code) | Partial Remainder (normal code) | Signed Quotient (Gray code) |
| XX | X010X | 010 |
| XX | 1XX0X | 100 |
| 0X | X0X11 | 010 |
| XX | X01X0 | 010 |
| 1X | 001XX | 011 |
| 0X | 1X0XX | 001 |
| X1 | X0X0X | 001 |
| 0X | 1X000 | 010 |
| XX | X0X00 | 001 |
| XX | 1X00X | 010 |
| XX | 01XXX | 010 |
| XX | 1X0XX | 100 |
| XX | 1X00X | 001 |
| XX | 10XXX | 101 |
| XX | X00XX | 001 |

TABLE 3-continued

| INPUT SIGNALS | | OUTPUT SIGNAL |
|---|---|---|
| Divisor Bits (Gray code) | Partial Remainder (normal code) | Signed Quotient (Gray code) |
| XX | 100XX | 010 |

We have estimated that about 30% fewer transistors are required to implement the Table 3 version of quotient predictor 100 than to implement the Table 2 quotient predictor. This reason for this savings may be appreciated by recognizing that a programmable logic array processes Boolean one (1), zero (0), and "don't care" (X) signals, so that it has topology corresponding to an N-dimensional binary hypercube. In performing SRT division, adding a 1 to a normally coded operand integer (or adding 2 n to an n-bit fraction) can break through the hypercube topology, causing all bits (or a large number of them) to change. This topology complicates the design of conventional SRT division circuitry for manipulating normally coded operands. In contrast, use of Gray coded operands improves the topology, so that adding a 1 to an integer will never change more than one bit. Thus, in a Gray code implementation, "off-by-one" tolerances map well into single term "don't cares."

The above description is merely illustrative of the present invention. Various changes in shapes, sizes, time intervals, and other details of method and construction may be within the scope of the invention as defined by the appended claims.

What is claimed is:

1. A method for performing higher radix nonrestoring division, including the steps of:
   (a) dividing a Gray coded dividend signal by a divisor signal to generate a Gray cooled quotient signal having at least two Gray coded quotient bits, wherein the divisor signal includes two most significant bits, and wherein the two most significant bits of the divisor signal are Gray coded bits;
   (b) generating normally binary coded quotient bit signals from the Gray coded quotient bits; and
   (c) generating a final quotient signal from the normally binary encoded quotient bit signals.

2. The method of claim 1, wherein step (a) includes a sequence of iteration cycles, wherein each of the iteration cycles includes a first phase and a second phase, and wherein the first phase of each of the iteration cycles includes the steps of:
   generating two Gray coded quotient bits, and a sign bit for the two Gray coded quotient bits, from selected bits of the dividend signal and selected bits of the divisor signal.

3. The method of claim 1, wherein step (a) includes a sequence of iteration cycles, wherein each of the iteration cycles includes a first phase and a second phase, wherein the first phase of each of the iteration cycles includes the steps of
   generating a first multi-bit Gray coded quotient signal, a first partial remainder sum signal, and a first partial remainder sum signal from selected bits of the dividend signal and selected bits of the divisor signal, wherein the first multi-bit Gray coded quotient signal includes two quotient magnitude bits and a sign bit, and wherein each of the second phases includes the steps of generating a second multi-bit Gray coded quotient signal, a second partial remainder sum signal, and a second partial remainder carry signal, from a partial remainder signal and selected bits of the divisor signal, wherein the second multi-bit Gray coded quotient signal includes two quotient magnitude bits and a sign bit.

4. The method of claim 3, wherein the first phase of each of the iteration cycles also includes the steps of:
   generating a multiplexed signal, wherein the multiplexed signal represents the dividend signal in the presence of an initialization signal, and the multiplexed signal represents the second partial remainder sum signal and the second partial remainder carry signal in the absence of the initialization signal;
   generating the first multi-bit Gray coded quotient signal in response to the divisor signal and the multiplexed signal;
   selecting a pre-calculated multiple of the divisor signal in response to the divisor signal, a divisor multiple signal, and the first multi-bit Gray coded quotient signal; and
   generating the first partial remainder sum signal and the first partial remainder carry signal in response to the multiplexed signal and the selected pre-calculated multiple of the divisor signal.

5. The method of claim 1, wherein the divisor signal is a 56-bit signal, the dividend signal is a 56-bit signal, and wherein at least fourteen two-phase iteration cycles are performed during step (a) in a double-precision mode to generate at least fifty-six Gray coded quotient bits.

6. The method of claim 1, wherein the divisor signal is a 56-bit signal, the dividend signal is a 56-bit signal, and wherein at least seven two-phase iteration cycles are performed during step (a) in a single-precision mode to generate at least twenty-eight Gray coded quotient bits.

7. The method of claim 1, wherein the normally binary coded quotient bit signals include negative quotient bit signals and positive quotient bit signals, and wherein step (c) includes the steps of concatenating the positive quotient bit signals, concatenating the negative quotient bit signals, and subtracting the concatenated negative quotient bit signals from the concatenated positive quotient bit signals to generate the final quotient signal.

8. The method of claim 7, also including the steps of:
   generating a second partial remainder carry signal and a second partial remainder sum signal during a final one of the iteration cycles;
   generating a Sticky bit from the second partial remainder carry signal and the second partial remainder sum signal;
   identifying the two least significant bits of the final quotient signal as a Guard bit and a Round bit; and
   employing the Guard bit, the Round bit, and the Sticky bit to round and normalize the final quotient signal.

9. An apparatus for performing higher radix nonrestoring division, including:
   means for iteratively generating Gray coded quotient bit signals from a divisor signal and a dividend signal, wherein the divisor signal includes two most significant bits, and wherein the two most significant bits of the divisor signal are Gray coded bits;

means for decoding the Gray coded quotient bit signals to generate normally binary coded quotient bit signals; and means for generating a final quotient magnitude component vector signal from the normally binary coded quotient bit signals.

10. The apparatus of claim 9, wherein the means for iteratively generating Gray coded quotient bit signals includes:

a first set of registers for storing a first set of signals;

a first divider block circuit connected to the first set of registers for generating a first multi-bit quotient signal from the divisor signal and the first set of signals during a first phase of each iteration cycle;

a second set of registers for storing a second set of signals; and a second divider block circuit connected to the second set of registers for generating a second multi-bit quotient signal from the divisor signal and the second set of signals during a second phase of each iteration cycle.

11. The apparatus of claim 10, wherein the first divider block includes a means for generating a first partial remainder sum signal and a first partial remainder carry signal during each first phase, wherein the first multi-bit quotient signal includes two quotient magnitude bits and a sign bit, wherein the second divider block includes a means for generating a second partial remainder sum signal and a second partial remainder carry signal during each second phase, and wherein the second multi-bit quotient signal includes two quotient magnitude bits and a sign bit.

12. The apparatus of claim 11, wherein the divisor signal is a 56-bit signal, the dividend signal is a 56-bit signal, and wherein the means for iteratively generating Gray coded quotient bit signals performs at least fourteen iteration cycles in a double-precision mode to generate at least fifty-six quotient magnitude bits wherein at least twenty-eight of the quotient magnitude bits are generated during the first phases of the iteration cycles.

13. The apparatus of claim 11, wherein the divisor signal is a 56-bit signal, the dividend signal is a 56-bit signal, and wherein the means for iteratively generating Gray coded quotient bit signals performs at least seven iteration cycles in a single-precision mode to generate at least twenty-eight quotient magnitude bits, wherein at least fourteen of the quotient magnitude bits are generated during the first phases of the iteration cycles.

14. The apparatus of claim 11, also including:

a multiplexing means connected between the first divider block circuit and the second divider block circuit for receiving the dividend signal, the second partial remainder sum signal, and the second partial remainder carry signal, wherein the multiplexing means asserts the divided signal in response to an initialization signal, and wherein the multiplexing means asserts the second partial remainder sum signal and the second partial remainder carry signal in the absence of the initialization signal.

15. The apparatus of claim 14, wherein the first divider block and the second divider block also receive a divisor multiple signal, and wherein the first divider block circuit includes:

a quotient prediction unit connected to the multiplexing means for generating the first multi-bit quotient signal in response to the divisor signal and the output of the multiplexing means;

a divisor multiple selector connected to the quotient prediction unit for generating a precalculated multiple of the divisor signal in response to the divisor signal, the divisor multiple signal, and the first multi-bit quotient signal; and a partial remainder adder circuit connected to the multiplexing means for receiving the output of the multiplexing means and the pre-calculated multiple of the divisor signal, and generating the first partial remainder sum signal and the first partial remainder carry signal in response to the output of the multiplexing means and the pre-calculated multiple of the divisor signal.

16. The apparatus of claim 9, also including means for Gray coding the two most significant bits of the divisor signal.

* * * * *

UNITED STATES PATENT AND TRADEMARK OFFICE
CERTIFICATE OF CORRECTION

PATENT NO. : 5,103,420

DATED : April 7, 1992

INVENTOR(S) : Dror Avnon et al.

It is certified that error appears in the above - identified patent and that said Letters Patent is hereby corrected as shown below:

In Col. 7, line 61, should read "partial remainder carry signal from selected bits of"

In Col. 10, line 1, delete the word [iteratiely] and replace with "iteratively".

Signed and Sealed this

Fifteenth Day of June, 1993

Attest:

MICHAEL K. KIRK

*Attesting Officer*   *Acting Commissioner of Patents and Trademarks*